US012025201B2

(12) United States Patent
Park et al.

(10) Patent No.: US 12,025,201 B2
(45) Date of Patent: Jul. 2, 2024

(54) DISPLACEMENT-CONTROLLED EARTHQUAKE-RESISTANT TRANSFORMER EMPLOYING FRICTION DAMPER

(71) Applicant: ENERTECH CO., LTD., Seongnam-si (KR)

(72) Inventors: Hoon Yang Park, Seongnam-si (KR); Seung Iel Park, Ansan-si (KR); Jong Hyeon Sim, Seoul (KR); Kyoung Kyu Choi, Seoul (KR); Seung Jae Lee, Seoul (KR); Ji Eon Lee, Seoul (KR)

(73) Assignee: ENERTECH CO., LTD., Seongnam-Si (KR)

( * ) Notice: Subject to any disclaimer, the term of this patent is extended or adjusted under 35 U.S.C. 154(b) by 249 days.

(21) Appl. No.: 17/674,516

(22) Filed: Feb. 17, 2022

(65) Prior Publication Data

US 2022/0275849 A1 Sep. 1, 2022

(30) Foreign Application Priority Data

Feb. 26, 2021 (KR) .......................... 10-2021-0026740

(51) Int. Cl.
*F16F 15/02* (2006.01)
*F16F 7/08* (2006.01)
*F16M 1/00* (2006.01)
*H01F 27/02* (2006.01)

(52) U.S. Cl.
CPC ............ *F16F 15/022* (2013.01); *F16F 7/087* (2013.01); *F16M 1/00* (2013.01); *H01F 27/02* (2013.01); *F16F 2222/04* (2013.01)

(58) Field of Classification Search
CPC ...... F16F 15/022; F16F 2222/04; F15F 7/087; F16M 1/00; H01F 27/02
USPC ....................................................... 52/167.1
See application file for complete search history.

(56) References Cited

U.S. PATENT DOCUMENTS

2020/0056676 A1* 2/2020 Martin Hernández .....................
F16F 15/022

FOREIGN PATENT DOCUMENTS

| JP | 2019-046866 A | 3/2019 |
| KR | 10-1937612 B1 | 1/2019 |
| KR | 10-2019-0066924 A | 6/2019 |
| KR | 10-2211457 B1 | 2/2021 |

* cited by examiner

*Primary Examiner* — Mark R Wendell
(74) *Attorney, Agent, or Firm* — NKL LAW; Jae Youn Kim (57) ABSTRACT

The present invention relates to a displacement-controlled earthquake-resistant transformer employing a friction damper, including: a device body; an upper frame disposed in an upper portion of the device body to fix the device body; a lower frame disposed in a lower portion of the device body to fix the device body to a base while supporting the device body; and a friction damper unit disposed between the device body and the base to interwork with the device body and the base, and configured to buffer a vibration transmitted to the device body through the base fixed to a ground surface. According to the present invention, seismic energy is absorbed by using a frictional force of a damper in the event of an earthquake, so that damage that may be caused to the transformer by an earthquake shock is prevented.

4 Claims, 12 Drawing Sheets

DISPLACEMENT-CONTROLLED EARTHQUAKE-RESISTANT TRANSFORMER EMPLOYING FRICTION DAMPER

BACKGROUND OF THE INVENTION

1. Field of the Invention

The present invention relates to a displacement-controlled earthquake-resistant transformer employing a friction damper, and more particularly, to an earthquake-resistant transformer in which a friction damper structure is applied to the transformer to improve earthquake-resistant performance.

2. Description of the Related Art

A transformer is a device including an iron core and a winding wire to convert a reception voltage or a distribution voltage into a voltage suitable for a load through electromagnetic induction, which is one of the most important devices in electric power transformation facilities.

A transformer in which a transformer body is immersed in insulating oil is referred to as an oil-immersed transformer, which is generally used due to a low price, strong dielectric strength, and a low maintenance cost thereof. In addition, a transformer in which a transformer body is insulated and molded with an epoxy resin is referred to as a molded transformer, which has a small size and a low risk of fire, but has vulnerability to an impulse voltage.

Since such transformers are installed in most electric power reception/transformation facilities, an operation of the transformer has to always be performed in a stable state for stable supply an electric power. In particular, considering that an earthquake having a magnitude of 5.8 has occurred at an epicenter of Gyeongju in 2016, Korea is also not a safe area from earthquakes, so that a device for protecting the transformer from a vibration of an earthquake is requisitely necessary to enable a control so that life and property may be maintained in an emergency situation.

In addition, since the transformers frequently have breakdowns and explosion accidents due to an impact and the like caused by a vibration, special attention and technology are required so that an impact transmitted to the transformer may be minimized to prevent breakdowns and explosions of the transformer caused by the vibration in the event of an earthquake.

In particular, when a transformer breaks down or explodes in the event of an earthquake, a protective relay of a power plant or a substation may detect the breakdown or explosion of the transformer so that a wide area may be blacked out, which may cause enormous damage to the life and property, so that there is an urgent need for developing technology for minimizing damage to the transformer caused by the earthquake.

Seismic waves include P-waves and S-waves that pass through an inside of the Earth, and surface waves (Rayleigh waves and Love waves) that travel along a ground surface of the Earth. In general, the waves are observed in an order of the P-waves, the S-waves, and the surface waves. The P-waves do not cause much damage to structures, whereas the S-waves and the surface waves do great damage to the structures. The P-wave is referred to as a push-wave, which is a longitudinal wave in which a propagation direction and a vibration direction are parallel to each other, and the S-wave is referred to as a shake-wave, which is a transverse wave in which the propagation direction and the vibration direction are perpendicular to each other. The surface wave propagating along the ground surface is referred to as a long-wave due to a large vibration and a long wavelength thereof, and causes the greatest damage such as landslides and building collapses among the seismic waves because the surface wave significantly shakes the ground surface. In particular, among the surface waves, the Rayleigh waves are observed later than the Love waves and have the strongest destructive power.

The surface waves may adversely affect a bus bar and peripheral devices connected to the transformer or cause a major accident, leading to departure of numerous devices, so that serious damage such as shutdown to various electric power reception/distribution devices including transformers may be secondarily caused by long-period surface waves.

However, in most cases, a conventional buffer device for an earthquake focuses on mitigating short-period vibrations, so that a separate device for attenuating long-period vibration waves is required when the conventional buffer device is applied. Therefore, a significant increase in a cost is unavoidable, and there is a concern that operations of a short-period vibration buffer device and a long-period vibration device may conflict with each other.

Therefore, there is an urgent need for technology capable of effectively attenuating short-period vibrations while attenuating long-period vibrations for a sensitive electric power reception/distribution device such as a transformer.

SUMMARY OF THE INVENTION

The present invention has been devised to solve the problems of the related art described above, and an object of the present invention is to provide an earthquake-resistant transformer in which a friction damper structure is applied to the transformer to improve earthquake-resistant performance.

To achieve the objects described above, according to the present invention, there is provided a displacement-controlled earthquake-resistant transformer employing a friction damper, the displacement-controlled earthquake-resistant transformer including: a device body; an upper frame disposed in an upper portion of the device body to fix the device body; a lower frame disposed in a lower portion of the device body to fix the device body to a base while supporting the device body; and a friction damper unit disposed between the device body and the base to interwork with the device body and the base, and configured to buffer a vibration transmitted to the device body through the base fixed to a ground surface.

In addition, according to an embodiment of the present invention, the friction damper unit may include: a damper base disposed on the ground surface to support a lower end portion of the lower frame; a support frame connected to both side portions of the upper frame; a first damper bar fixed to an upper portion of the damper base by a damper bracket; and a second damper bar having a lower portion connected to the first damper bar and an upper portion connected to the support frame.

In addition, according to an embodiment of the present invention, the friction damper unit may further include a friction pad disposed between the first damper bar and the second damper bar and making frictional contact with the first damper bar and the second damper bar to buffer the vibration, and the friction pad may include a material having relatively high elasticity or relatively high ductility as compared with a material of each of the first and second damper bars.

In addition, according to an embodiment of the present invention, a first center hole having a circular shape and formed on a center side of the first damper bar, a pad center hole having a circular shape and formed on a center side of the friction pad, and a second center hole having a circular shape and formed on a center side of the second damper bar may be connected to each other through a center bolt.

In addition, according to an embodiment of the present invention, a plurality of first side holes having a circular shape and formed on an outer side of the first damper bar in a circumferential direction, a plurality of pad side holes having an elliptical shape and formed on an outer side of the friction pad in a circumferential direction, and a plurality of second side holes having an elliptical shape and formed on an outer side of the second damper bar in a circumferential direction may be connected to each other through a plurality of side bolts to mitigate a displacement of the device body in a Y-axis direction.

In addition, according to an embodiment of the present invention, a plurality of first middle holes having a circular shape and formed between the first center hole and the first side hole on the first damper bar in the circumferential direction, a plurality of pad middle holes having an elliptical shape and formed between the pad center hole and the pad side hole on the friction pad in the circumferential direction, and a plurality of second middle holes having an elliptical shape and formed between the second center hole and the second side hole on the second damper bar in the circumferential direction may be connected to each other through middle bolts to mitigate the displacement of the device body in the Y-axis direction.

According to the present invention, seismic energy may be absorbed by using a frictional force of a damper in the event of an earthquake, so that damage that may be caused to the transformer by an earthquake shock can be prevented.

In addition, the present invention has a simple structure and does not occupy a wide space, installation can be easily performed in existing transformer facilities, and maintenance and repair can be easily performed.

DETAILED DESCRIPTION OF THE INVENTION

Hereinafter, a displacement-controlled earthquake-resistant transformer employing a friction damper according to exemplary embodiments of the present invention will be described in detail with reference to the accompanying drawings.

Figure 1:
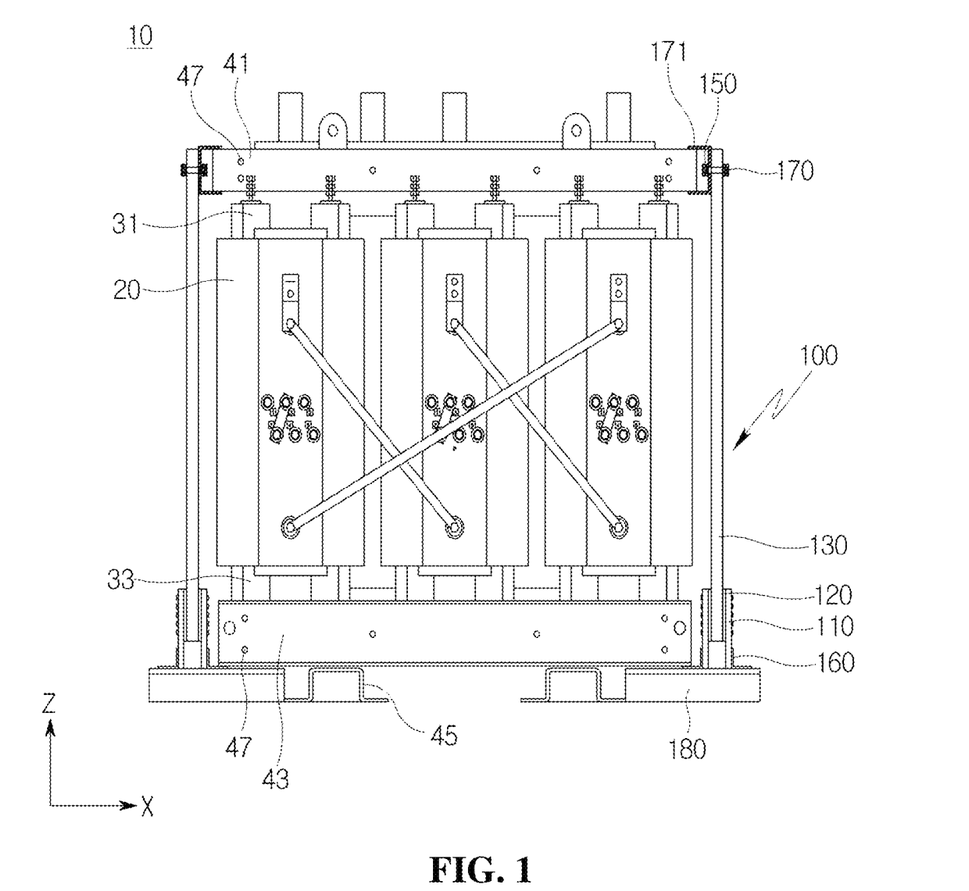
FIG. 1 is a front view showing an arrangement position of a friction damper unit of an earthquake-resistant transformer according to the present invention.
Figure 2:
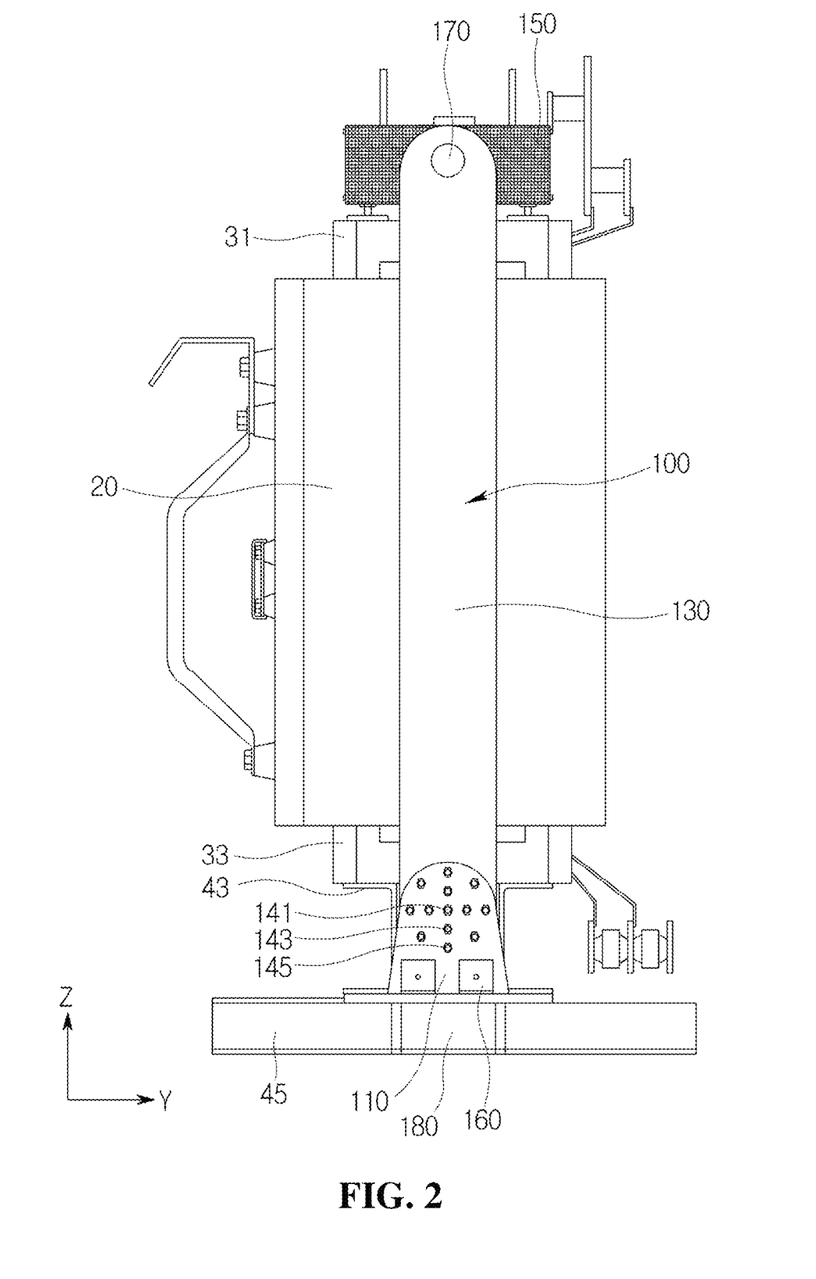
FIG. 2 is a side view showing the arrangement position of the friction damper unit of the earthquake-resistant transformer according to the present invention.

Referring to FIGS. 1 and 2, according to the present invention, an earthquake-resistant transformer 10 may include a device body 20, a first spacer 31, a second spacer 33, an upper frame 41, a lower frame 43, and a friction damper unit 100.

The device body 20 may constitute an exterior of a molded transformer, and may be implemented in a cylindrical shape. Openings (not shown) may be formed in upper and lower center sides of the device body 20.

Basically, the molded transformer may include an iron core, a low-voltage coil, and a high-voltage coil.

First, the iron core may pass through a center portion of the device body 20 through openings formed at a top and a bottom of the device body 20.

In addition, the low-voltage coil may be arranged inside the device body 20 in a circumferential direction. The low-voltage coil may surround an outer periphery of the iron core while being spaced apart from the iron core by a predetermined distance.

In addition, the high-voltage coil may be arranged inside the device body 20 in the circumferential direction. In this case, the high-voltage coil may surround an outer periphery of the low-voltage coil while being spaced apart from the low-voltage coil by a predetermined distance.

A plurality of first spacers 31 may be disposed in an upper portion of the device body 20. A plurality of second spacers 33 may be disposed in a lower portion of the device body 20. In this case, the first spacer 31 and the second spacer 33 may be disposed at corresponding positions of the upper and lower portions of the device body, respectively.

The upper frame 41 may be a C-shaped frame disposed in an upper portion of the first spacer 31 to support the device body 20. In addition, the lower frame 43 may be a C-shaped frame disposed in a lower portion of the second spacer 33 to fix the device body 20 to a base 45 while supporting the device body 20. However, shapes of the upper frame 41 and the lower frame 43 are not necessarily limited to the above configuration.

The iron core may protrude upward and downward from the device body 20 to traverse a longitudinal direction of the upper frame 41 and the lower frame 43.

In addition, a pair of upper frames 41 and a pair of lower frames 43 may be arranged with respect to the iron core, and fastened to each other with connection bolts 47 to fix and support the device body 20, respectively.

Meanwhile, the friction damper unit 100 may be disposed between the device body 20 and the base 45 to interwork with the device body 20 and the base 45, and may perform a function of buffering a vibration transmitted to the device body 20 through the base 45 fixed to a ground surface.

The friction damper unit 100 may include a damper base 180, a support frame 150, a first damper bar 110, a second damper bar 130, and a friction pad 120.

The damper base 180 may be disposed on the ground surface to support a lower end portion of the lower frame 43.

Figure 3:
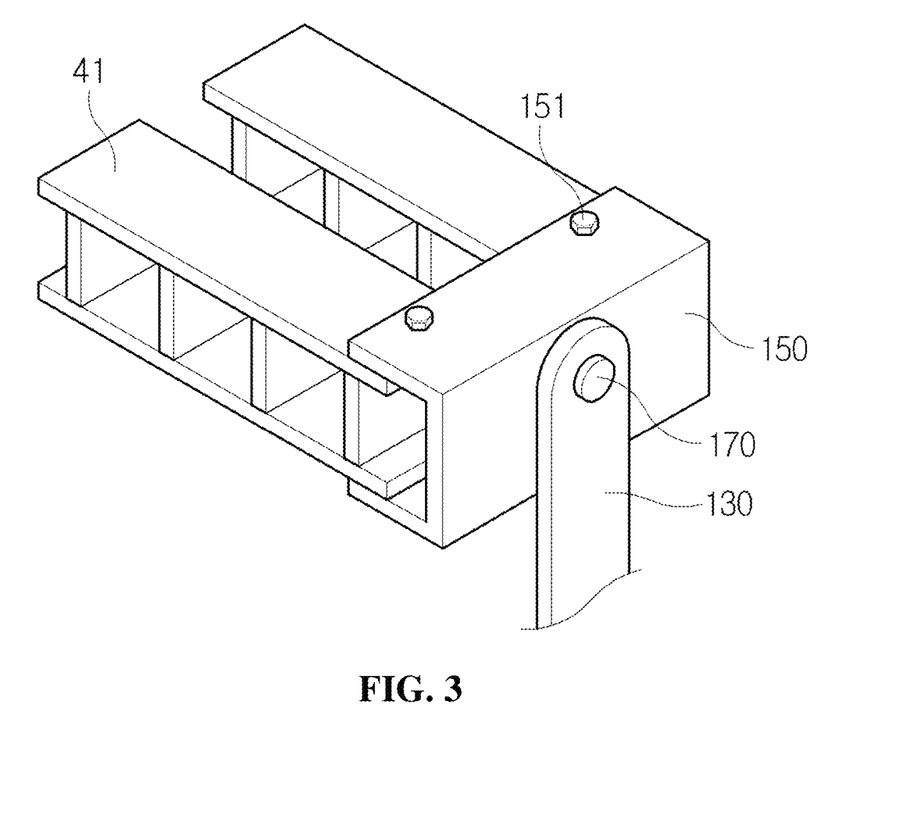
FIG. 3 is a partial perspective view showing an arrangement structure of a support frame of the earthquake-resistant transformer according to the present invention.

The support frame 150 may be connected to both side portions of the upper frame 41. Referring to FIGS. 1 and 3, the support frame 150 may have a C-shape, and a top and a bottom of the support frame 150 may be fastened and coupled to the upper frame 41 through bolts 151. In addition, a side surface of the support frame 150 may be connected to an upper portion of the second damper bar 130 through coupling of a hinge pin 170 and a counter nut 171.

The support frame 150 may include a metal material with excellent rigidity, such as iron, or a material such as reinforced ceramic.

The first damper bar 110 may be fixed to an upper portion of the damper base 180 by fastening a bolt to a damper bracket 160.

Figure 4:
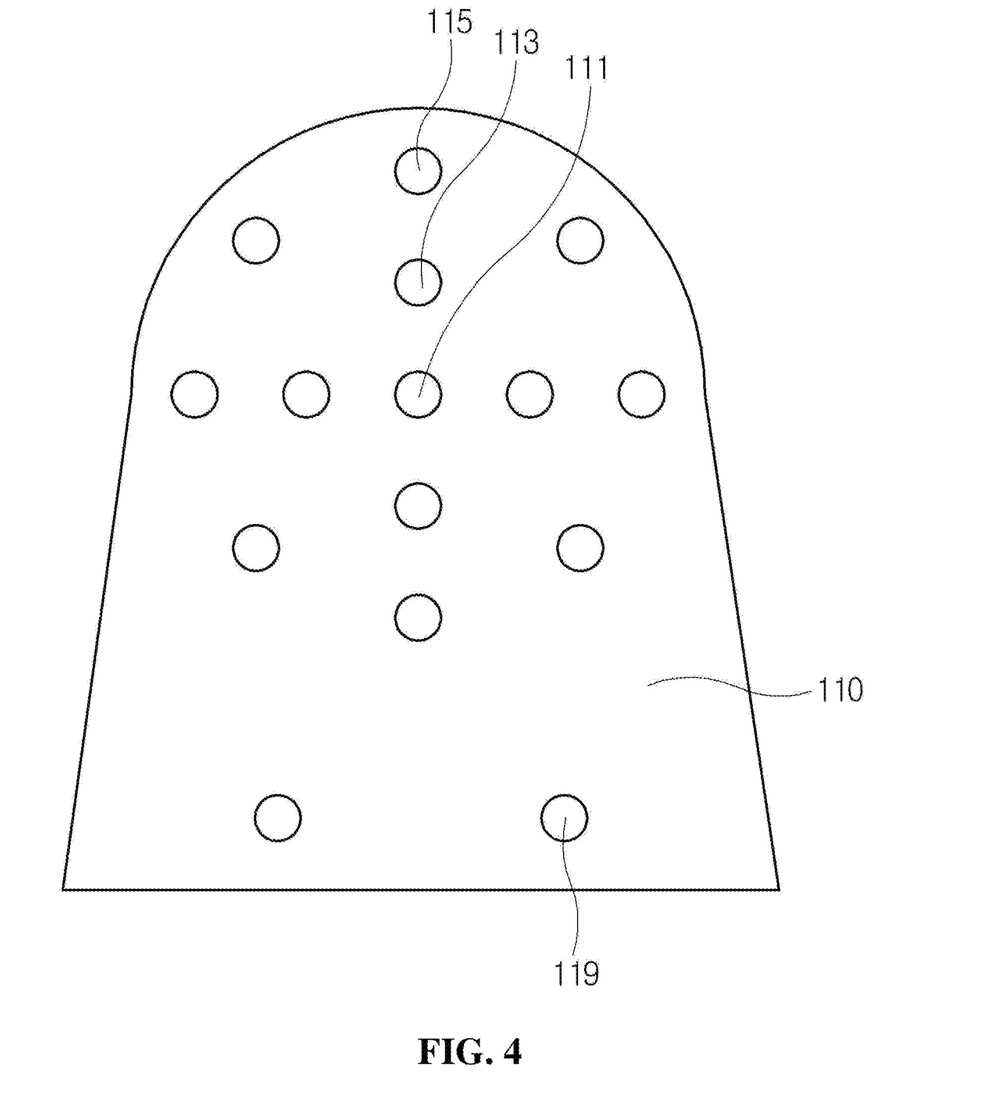
FIG. 4 is a front view showing a structure of a first damper bar of the earthquake-resistant transformer according to the present invention.

Referring to FIG. 4, the first damper bar 110 may include a first center hole 111, a first middle hole 113, a first side hole 115, and a bracket hole 119.

The first center hole 111 may be formed on a center side of the first damper bar 110, and may have a circular shape. The first side hole 115 may be formed on an outer side of the first damper bar 110, and may have a circular shape. A plurality of first middle holes 113 may be formed between the first center hole 111 and the first side hole 115 in a circumferential direction, and may have a circular shape.

The first damper bar 110 may be fixed to the upper portion of the damper base 180 by fastening a bolt to the bracket hole 119.

Figure 6:
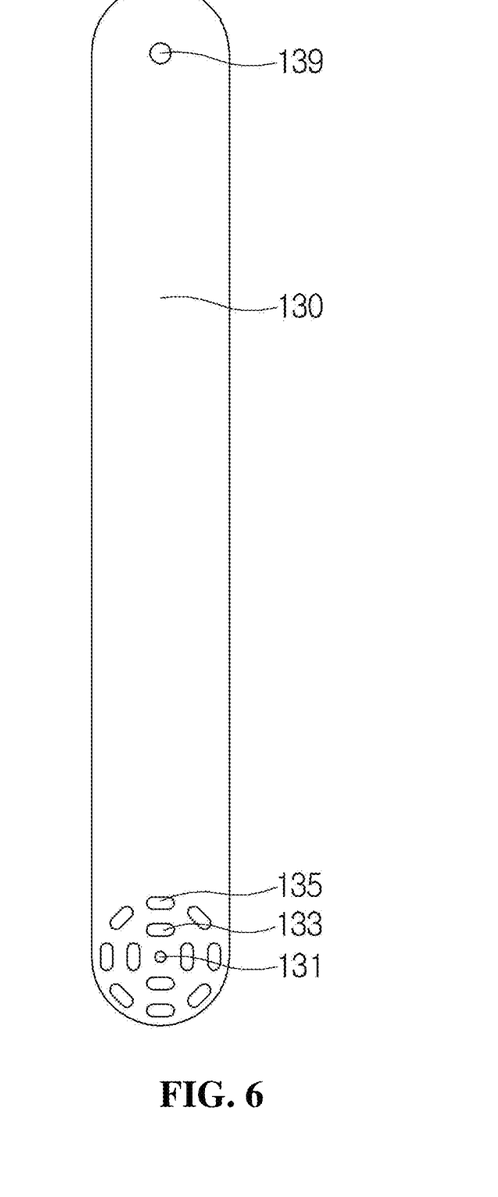
FIG. 6 is a front view showing a structure of a second damper bar of the earthquake-resistant transformer according to the present invention.

The second damper bar 130 may have a lower portion connected to the first damper bar 110, and an upper portion connected to the support frame 150.

Referring to FIG. 6, the second damper bar 130 may include a second center hole 131, a second middle hole 133, a second side hole 135, and an upper hole 139.

The second center hole 131 may be formed on a center side of the second damper bar 130, and may have a circular shape. A plurality of second side holes 135 may be formed on an outer side of the second damper bar 130, and may have an elliptical shape. A plurality of second middle holes 133 may be formed between the second center hole 131 and the second side hole 135 in a circumferential direction, and may have an elliptical shape.

Side portions of the second damper bar 130 and the support frame 150 may be connected to each other by fastening the hinge pin 170 to the counter nut 171 through the upper hole 139.

Each of the first and second damper bars may include a metal material with excellent rigidity, such as iron, or a material such as reinforced ceramic.

Figure 5:
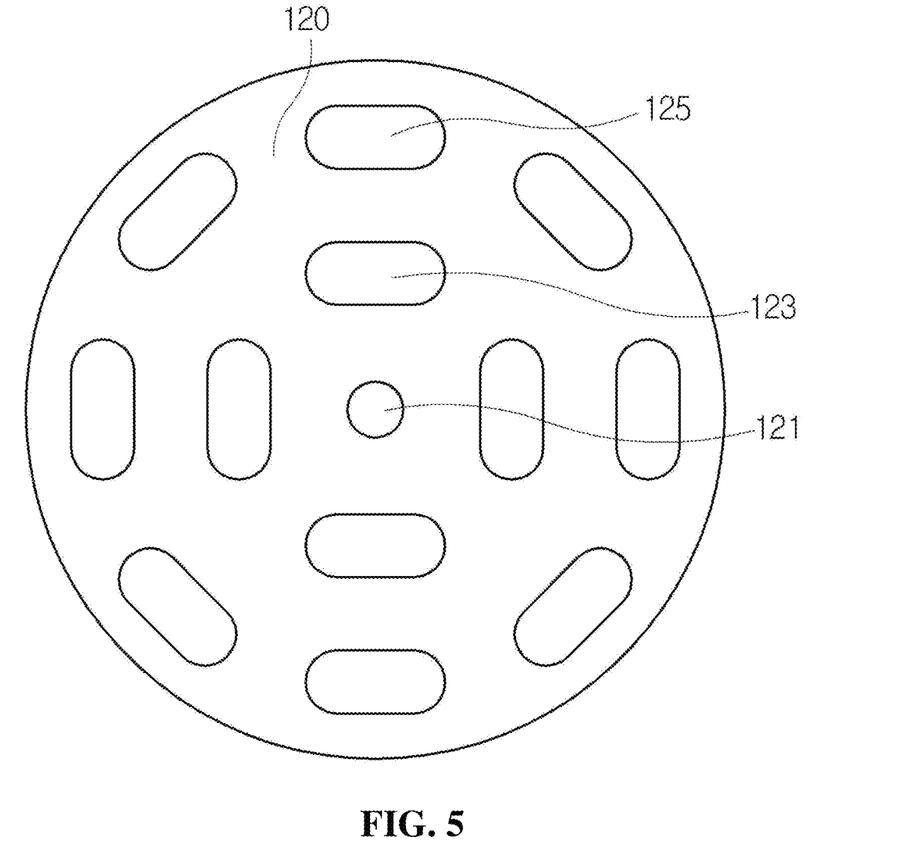
FIG. 5 is a front view showing a structure of a friction pad of the earthquake-resistant transformer according to the present invention.

The friction pad 120 may be disposed between the first damper bar 110 and the second damper bar 130, and may make frictional contact with the first damper bar 110 and the second damper bar 130 to buffer the vibration. The friction pad 120 may include an elastic material such as rubber or a metal material with high ductility such as lead or copper.

In other words, the friction pad 120 may include a material having relatively high elasticity or a material having relatively high ductility as compared to a material of each of the first and second damper bars 110 and 130. This is because the friction pad 120 has to make frictional contact with the first and second damper bars 110 and 130 to absorb the vibration.

While a material characteristic of the friction pad 120 is long-term use, a user may replace only the friction pad 120 in a case of damage or breakage caused by an actual earthquake, so that a cost for maintenance and repair may be reduced, and maintenance and repair operations may become easier.

Referring to FIG. 5, the friction pad 120 may include a pad center hole 121, a pad middle hole 123, and a pad side hole 125.

The pad center hole 121 may be formed on a center side of the friction pad 120, and may have a circular shape. A plurality of pad side holes 125 may be formed on an outer side of the friction pad 120, and may have an elliptical shape. A plurality of pad middle holes 123 may be formed between the pad center hole 121 and the pad side hole 125 on the friction pad 120 in a circumferential direction, and may have an elliptical shape.

In this case, FIGS. 1 and 2 may show a state in which the friction pad 120 is disposed between the first and second damper bars 110 and 130 on the damper base 180.

Vibrations and shaking caused by the earthquake and transmitted from the ground surface to the base 45, the lower frame 43, the device body 20, and the upper frame 41 may be reduced by a frictional resistance using surface contact on surfaces of the friction pad 120 disposed on the upper portion of the damper base 180 that face the first and second damper bars 110 and 130, respectively. As a result, the vibrations and shaking transmitted upward from the lower frame 43 to the device body 20 and the upper frame 41 may be buffered in an entire portion of the mold transformer.

Figure 7:
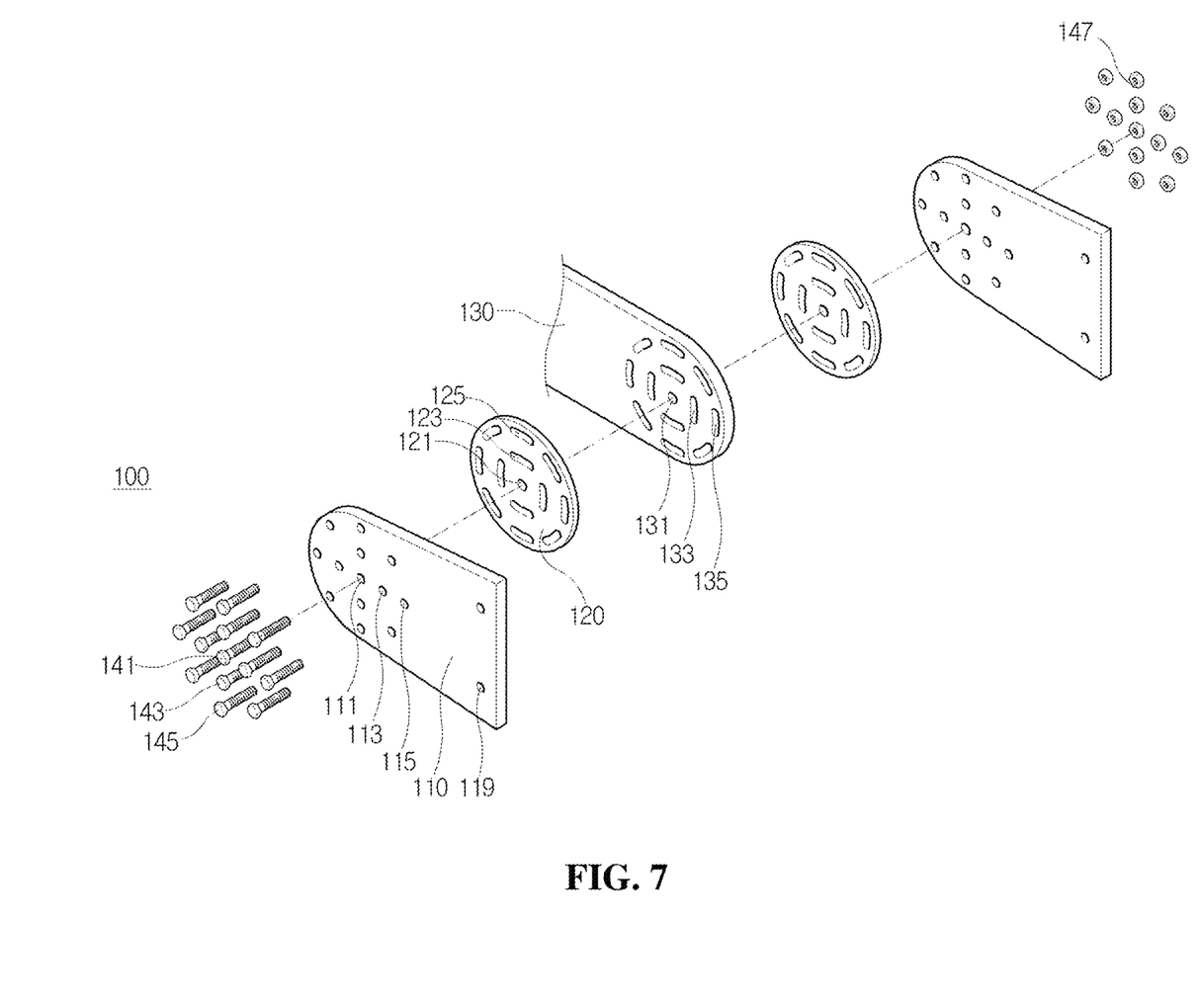
FIG. 7 is an exploded perspective view showing the friction damper unit according to the present invention.

Meanwhile, FIG. 7 is an exploded perspective view showing the friction pad 120 between the first and second damper bars 110 and 130.

The first center hole 111 having a circular shape and formed on the center side of the first damper bar 110, the pad center hole 121 having a circular shape and formed on the center side of the friction pad 120, and the second center hole 131 having a circular shape and formed on the center side of the second damper bar 130 may be coupled and connected to each other through by a center bolt 141 and a nut 147.

The first side holes 115 having a circular shape and formed on the outer side of the first damper bar 110 in the circumferential direction, the pad side holes 125 having an elliptical shape and formed on the outer side of the friction pad 120 in the circumferential direction, and the second side holes 135 having an elliptical shape and formed on the outer side of the second damper bar 130 in the circumferential direction may be coupled and connected to each other by a plurality of side bolts 145 and nuts 147.

The first middle holes 113 having a circular shape and formed between the first center hole 111 and the first side hole 115 on the first damper bar 110 in the circumferential direction, the pad middle holes 123 having an elliptical shape and formed between the pad center hole 121 and the pad side holes 125 on the friction pad 120 in the circumferential direction, and the second middle holes 133 having an elliptical shape and formed between the second center hole 131 and the second side hole 135 on the second damper bar 130 in the circumferential direction may be coupled and connected to each other by middle bolts 143 and nuts 147.

In this case, each of the pad middle hole 123, the pad side hole 125, the second middle hole 133, and the second side hole 135 may have an elliptical shape, the pad middle holes 123 and the pad side holes 125 may be disposed in the friction pad 120 in the circumferential direction, and the second middle holes 133 and the second side holes 135 may be disposed in the second damper bar 130 in the circumferential direction.

Since the middle bolt 143 and the side bolt 145 may move in the circumferential direction within the holes having an elliptical shape, a displacement of the device body 20 in a Y-axis direction may be mitigated.

Since the center bolt 141 is coupled to the hole having a circular shape, the center bolt 141 may function as a center axis.

In addition, since the middle bolt 143 and the side bolt 145 are coupled to the holes having an elliptical shape, the middle bolt 143 and the side bolt 145 may slightly move in the circumferential direction about the center bolt 141.

In this case, since the first and second damper bars 110 and 130 make surface contact with the friction pad 120, when the middle bolt 143 and the side bolt 145 move within the holes having an elliptical shape, a frictional resistance may be generated to suppress the movement. During the above action, the displacement of the device body 20 in the Y-axis direction may be mitigated.

According to the present invention, seismic energy may be absorbed by using a frictional force of a damper described above, so that damage that may be caused to the transformer by the vibrations and shaking in the event of an earthquake may be prevented.

Meanwhile, FIGS. 8 to 13 show experimental data showing earthquake-resistant performance of the earthquake-resistant transformer according to the present invention. An experimental condition was set as an ICC-ES AC156 standard, which is an acceptable standard for seismic certification, and a magnitude of an earthquake was 6.0 to 7.0.

Figure 8:
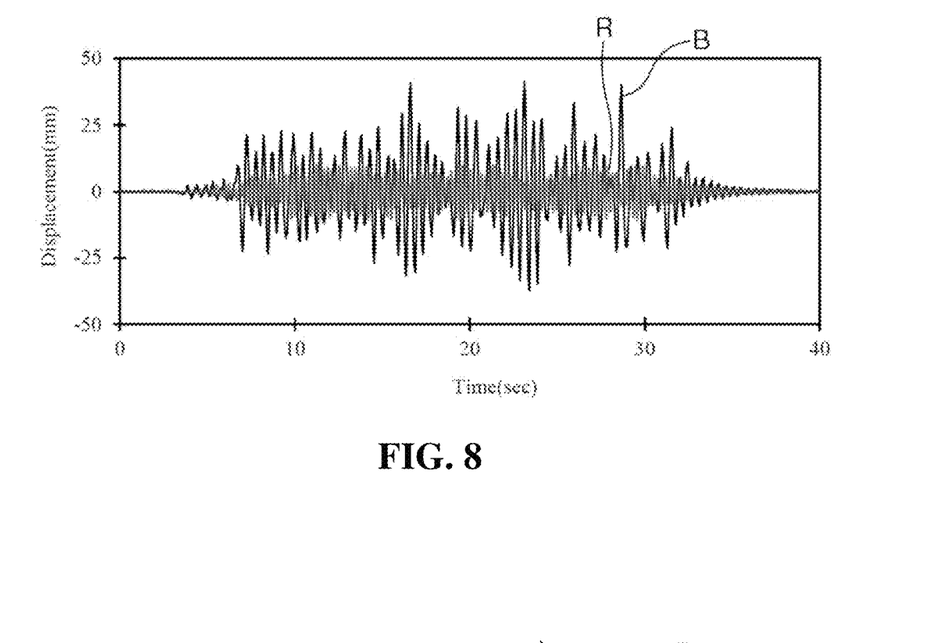
FIG. 8 is experimental data showing earthquake-resistant performance of the earthquake-resistant transformer according to the present invention with respect to a displacement in a Y-axis direction according to a time when 100% of a seismic wave conforming to an AC156 standard is applied.

FIG. 8 is experimental data showing earthquake-resistant performance of the earthquake-resistant transformer according to the present invention with respect to a displacement in a Y-axis direction according to a time when 100% of a seismic wave conforming to an AC156 standard is applied.

According to the experimental data, B denotes a displacement of a conventional molded transformer in a Y-axis direction, and R denotes a displacement of an earthquake-resistant transformer according to the present invention in a Y-axis direction. In this case, a displacement value is based on an uppermost portion of the transformer.

According to displacement values of the experimental data, it was found that a displacement value in the Y-axis direction is reduced in the earthquake-resistant transformer R according to the present invention as compared with the conventional molded transformer B under the above experimental conditions, which corresponds to a decrease of approximately 68%.

Figure 9:
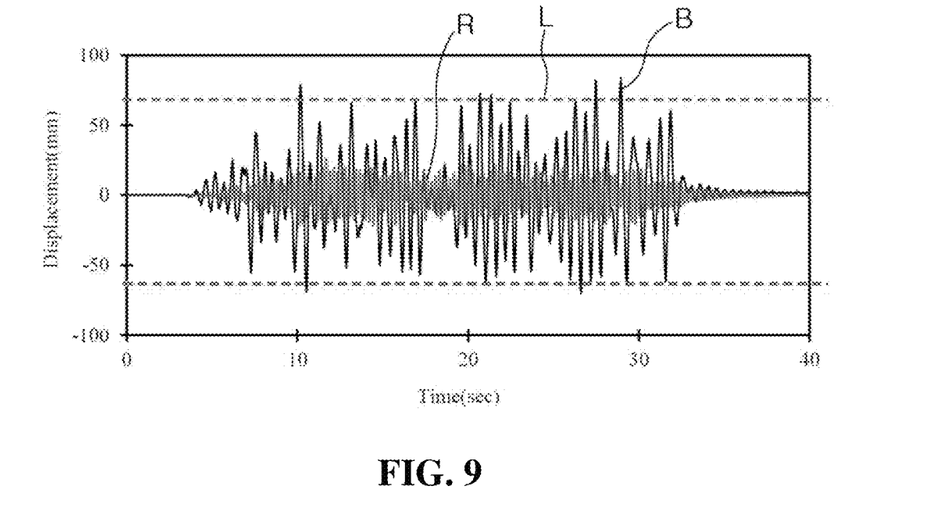
FIG. 9 is experimental data showing earthquake-resistant performance of the earthquake-resistant transformer according to the present invention with respect to a displacement in the Y-axis direction according to a time when 200% of the seismic wave conforming to the AC156 standard is applied.

FIG. 9 is experimental data showing earthquake-resistant performance of the earthquake-resistant transformer according to the present invention with respect to a displacement in the Y-axis direction according to a time when 200% of the seismic wave conforming to the AC156 standard is applied.

According to the experimental data, B denotes a displacement of a conventional molded transformer in a Y-axis direction, and R denotes a displacement of an earthquake-resistant transformer according to the present invention in a Y-axis direction. In this case, a displacement value is based on an uppermost portion of the transformer.

According to displacement values of the experimental data, it was found that a displacement value in the Y-axis direction is reduced in the earthquake-resistant transformer R according to the present invention as compared with the conventional molded transformer B under the above experimental conditions, which corresponds to a decrease of approximately 68%.

It was found through FIG. 9 that the earthquake-resistant transformer according to the present invention satisfies a unidirectional displacement width of 75 mm (dashed line L), which is a determination condition of an earthquake-resistant test scheme (earthquake-resistant test scheme for broadcasting and communication facilities 2015) stipulated in standards of the National Radio Research Institute in Korea.

Exact displacement values of the experimental data are shown in Table 1 below.

TABLE 1

| Uppermost portion of molded transformer | | AC156 100% | AC156 200% |
|---|---|---|---|
| Y-dir (mm) | B | 41.25 | 84.15 |
|  | R | 13.01 | 26.51 |

Figure 10:
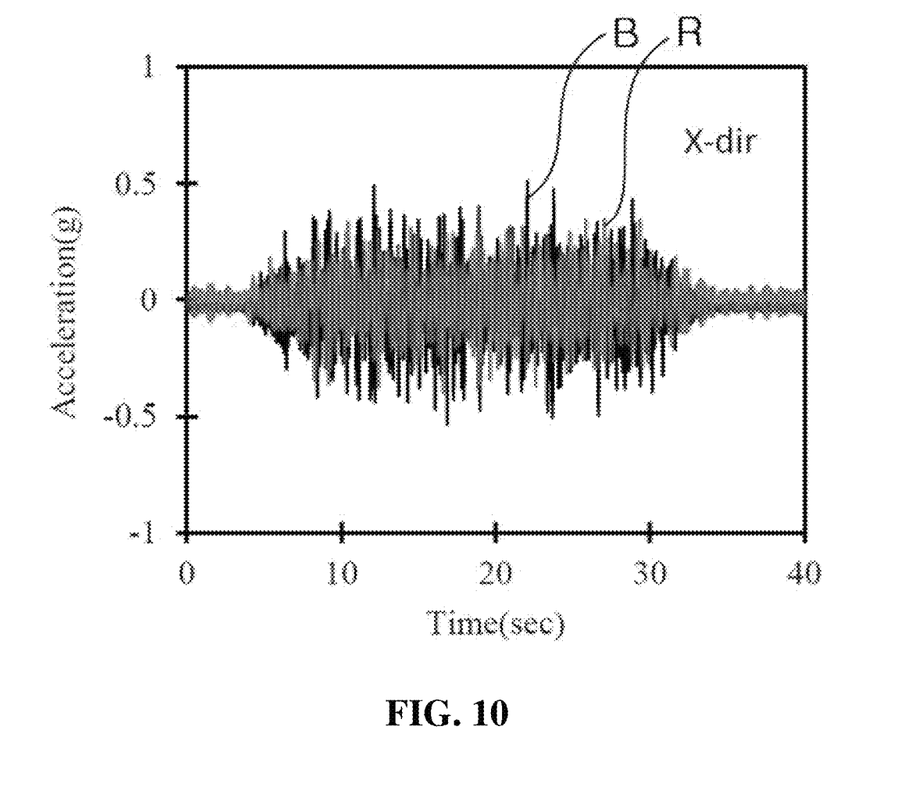
FIG. 10 is experimental data showing earthquake-resistant performance of the earthquake-resistant transformer according to the present invention with respect to a response acceleration in an X-axis direction according to a time when 100% of the seismic wave conforming to the AC156 standard is applied.

FIG. 10 is experimental data showing earthquake-resistant performance of the earthquake-resistant transformer according to the present invention with respect to a response acceleration in an X-axis direction according to a time when 100% of the seismic wave conforming to the AC156 standard is applied.

According to the experimental data, B denotes a response acceleration of a conventional molded transformer in an X-axis direction, and R denotes a response acceleration of an earthquake-resistant transformer according to the present invention in an X-axis direction. In this case, a displacement value is based on an uppermost portion of the transformer.

According to response acceleration values of the experimental data, it was found that a response acceleration value in the X-axis direction is reduced in the earthquake-resistant transformer R according to the present invention as compared with the conventional molded transformer B under the above experimental conditions, which corresponds to a decrease of approximately 28%.

Figure 11:
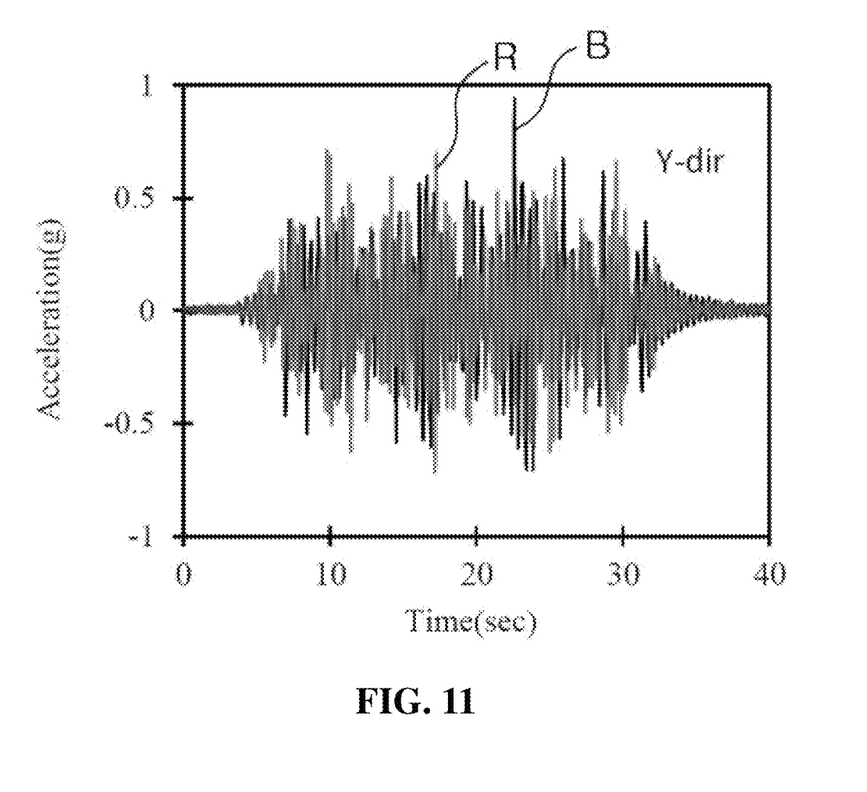
FIG. 11 is experimental data showing earthquake-resistant performance of the earthquake-resistant transformer according to the present invention with respect to a response acceleration in the Y-axis direction according to a time when 100% of the seismic wave conforming to the AC156 standard is applied.

FIG. 11 is experimental data showing earthquake-resistant performance of the earthquake-resistant transformer according to the present invention with respect to a response acceleration in the Y-axis direction according to a time when 100% of the seismic wave conforming to the AC156 standard is applied.

According to the experimental data, B denotes a response acceleration of a conventional molded transformer in a Y-axis direction, and R denotes a response acceleration of an earthquake-resistant transformer according to the present invention in a Y-axis direction. In this case, a displacement value is based on an uppermost portion of the transformer.

According to response acceleration values of the experimental data, it was found that a response acceleration value in the Y-axis direction is reduced in the earthquake-resistant transformer R according to the present invention as compared with the conventional molded transformer B under the above experimental conditions, which corresponds to a decrease of approximately 32%.

Figure 12:
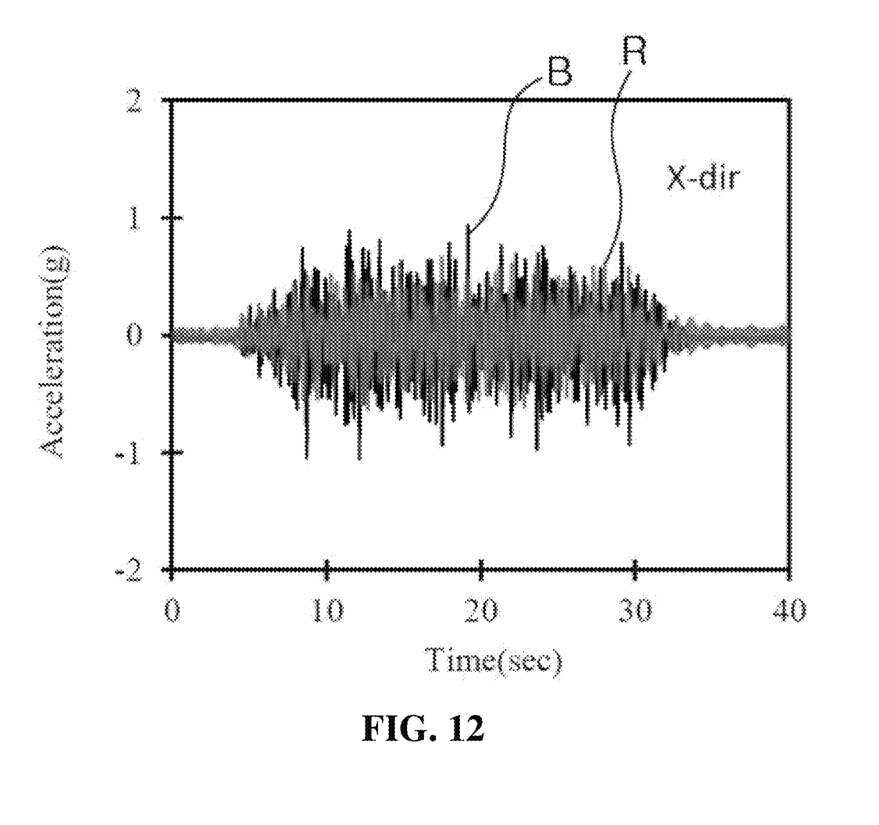
FIG. 12 is experimental data showing earthquake-resistant performance of the earthquake-resistant transformer according to the present invention with respect to a response acceleration in the X-axis direction according to a time when 200% of the seismic wave conforming to the AC156 standard is applied.

FIG. 12 is experimental data showing earthquake-resistant performance of the earthquake-resistant transformer according to the present invention with respect to a response acceleration in the X-axis direction according to a time when 200% of the seismic wave conforming to the AC156 standard is applied.

According to the experimental data, B denotes a response acceleration of a conventional molded transformer in an X-axis direction, and R denotes a response acceleration of an earthquake-resistant transformer according to the present invention in an X-axis direction. In this case, a displacement value is based on an uppermost portion of the transformer.

According to response acceleration values of the experimental data, it was found that a response acceleration value in the X-axis direction is reduced in the earthquake-resistant transformer R according to the present invention as compared with the conventional molded transformer B under the above experimental conditions, which corresponds to a decrease of approximately 30%.

Figure 13:
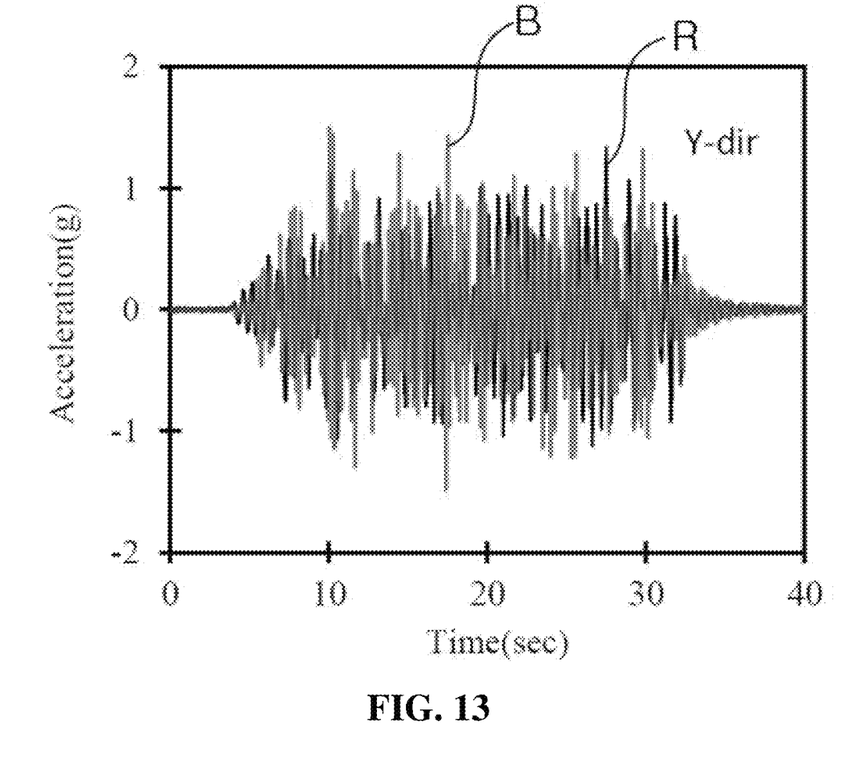
FIG. 13 is experimental data showing earthquake-resistant performance of the earthquake-resistant transformer according to the present invention with respect to a response acceleration in the Y-axis direction according to a time when 200% of the seismic wave conforming to the AC156 standard is applied.

FIG. 13 is experimental data showing earthquake-resistant performance of the earthquake-resistant transformer according to the present invention with respect to a response acceleration in the Y-axis direction according to a time when 200% of the seismic wave conforming to the AC156 standard is applied. According to the experimental data, B denotes a response acceleration of a conventional molded transformer in a Y-axis direction, and R denotes a response acceleration of an earthquake-resistant transformer according to the present invention in a Y-axis direction. In this case, a displacement value is based on an uppermost portion of the transformer.

In this case, it was found that there is no significant difference in the response acceleration values in the Y-axis direction between the conventional molded transformer B and the earthquake-resistant transformer R according to the present invention under the above experimental conditions.

Exact displacement values of the experimental data are shown in Table 2 below.

TABLE 2

| Uppermost portion of molded transformer | | AC156 100% | AC156 200% |
| --- | --- | --- | --- |
| X-dir (g) | B | 0.54 | 1.05 |
|  | R | 0.39 | 0.71 |
| Y-dir (g) | B | 0.94 | 1.33 |
|  | R | 0.66 | 1.49 |

Accordingly, a specific embodiment of the displacement-controlled earthquake-resistant transformer employing the friction damper has been described.

Therefore, it will be easily understood by those of ordinary skill in the art that substitutes and changes can be made to the present invention in various forms without departing from the gist of the present invention as set forth in the appended claims.

What is claimed is:

1. A displacement-controlled earthquake-resistant transformer comprising:
a device body;
an upper frame disposed in an upper portion of the device body to fix the device body;
a lower frame disposed in a lower portion of the device body to fix the device body; and
a friction damper unit disposed between the device body and a ground surface to interwork with the device body and the ground surface, and configured to buffer a vibration transmitted from the ground surface to the device body,
wherein the friction damper unit includes:
a damper base disposed on the ground surface;
a support frame connected to a side portion of the upper frame;
a first damper bar fixed to an upper portion of the damper base by a damper bracket; and
a second damper bar having a lower portion connected to the first damper bar and an upper portion connected to the support frame,
wherein the damper base is configured to support a lower end portion of the lower frame and disposed on the ground surface,
wherein the support frame is connected to both side portions of the upper frame,
wherein the friction damper unit further includes a friction pad disposed between the first damper bar and the second damper bar and making frictional contact with the first damper bar and the second damper bar to buffer the vibration, and
wherein the friction pad includes a material having high elasticity or high ductility as compared with a material of each of the first and second damper bars.

2. The displacement-controlled earthquake-resistant transformer of claim 1, wherein a first center hole having a circular shape and formed on a center side of the first damper bar, a pad center hole having a circular shape and formed on a center side of the friction pad, and a second center hole having a circular shape and formed on a center side of the second damper bar are connected to each other through a center bolt.

3. The displacement-controlled earthquake-resistant transformer of claim 2, wherein a plurality of first side holes each having a circular shape and formed on an outer side of the first damper bar in a circumferential direction, a plurality of pad side holes each having an elliptical shape and formed on an outer side of the friction pad in a circumferential direction, and a plurality of second side holes each having an elliptical shape and formed on an outer side of the second damper bar in a circumferential direction are connected to each other through a plurality of side bolts to mitigate a displacement of the device body in a Y-axis direction.

4. The displacement-controlled earthquake-resistant transformer of claim 3, wherein a plurality of first middle holes each having a circular shape and formed between the first center hole and the first side hole on the first damper bar in the circumferential direction, a plurality of pad middle holes each having an elliptical shape and formed between the pad center hole and the pad side hole on the friction pad in the circumferential direction, and a plurality of second middle holes each having an elliptical shape and formed between the second center hole and the second side hole on the second damper bar in the circumferential direction are connected to each other through middle bolts to mitigate the displacement of the device body in the Y-axis direction.

* * * * *